United States Patent Office 3,082,245
Patented Mar. 19, 1963

---

3,082,245
POLYALKYLENE GLYCOL DIPROPIOLATES
Lee A. Miller, Dayton, Ohio, assignor to Monsanto Chemical Company, St. Louis, Mo., a corporation of Delaware
No Drawing. Filed Mar. 17, 1961, Ser. No. 96,391
16 Claims. (Cl. 260—486)

The present invention relates to esters, and more particularly provides esters of certain aliphatic oxyether and thioether glycols and certain acetylenic acids and the method of preparing the same.

An object of this invention is to provide new and useful acetylenic esters. Another object of this invention is to provide esters of propiolic acid, and oxyether and thioether glycols. A further object of this invention is to provide valuable reactive acetylenic acid esters of oxyether and thioether glycols which esters are valuable as paper treatment chemicals which enhance the chemical and physical characteristics of said paper.

These and other objects hereinafter defined are provided by the invention wherein there are prepared new and valuable esters of the formula

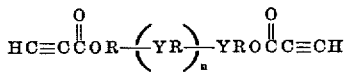

wherein Y is selected from the group consisting of oxygen and sulfur; R is an alkylene radical having from 2 to 4 carbon atoms in the alkylene chain and a total of from 2 to 6 carbon atoms in the alkylene radical; and $n$ is a whole number of from 0 to 200, said R radical being linked through diverse carbon atoms thereof to the remainder of the molecule of which it forms a part.

The presently provided acetylenic esters are prepared by reaction of a glycol of the formula

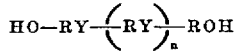

wherein R, Y, and $n$ are as defined above with a compound selected from the group consisting of propiolic acid, acyl halides, and anhydrides thereof, employing the reaction conditions which will hereinafter be described. They can also be prepared by alcoholysis procedures by reacting a simple ester of propiolic acid with the appropriate alkylene oxyether or thioether glycol. For example, diethylene glycol dipropiolate is prepared by reacting methyl propiolate with diethylene glycol.

The presently useful glycol compounds are those dihydric alkyleneoxyalkylene, polyalkyleneoxyalkylene, alkylenethioalkylene, and polyalkylenethioalkylene glycol compounds having from 2 to 4 carbon atoms in the alkylene chain and a total of from 2 to 6 carbon atoms in the alkylene radical. The glycols used have one oxygen or sulfur ether linkage between two alkylene radicals as defined above and may have as many as 200 or more such alkylene groups in the glycol reactant. The glycol compounds used are often described in terms of average molecular weight. Thus, compounds within the scope of this invention may be prepared from alkylene glycol compounds having molecular weights ranging from 106 to over 10,000. This method of describing the glycol used, i.e., using average molecular weights, is often preferred by those in the art since the glycol materials, because of the method in which they are made, are often as not mixtures of polyalkylene glycols of various chain length. In such a case, the material used is described in terms of average molecular weight. Such mixed glycols are also useful for preparing compounds within the scope of this invention.

Illustrative examples of alkyleneoxyalkylene and polyalkyleneoxyalkylene glycols that may be used are diethylene glycol, dipropylene glycol, diisopropylene glycol, dibutylene glycol, diisobutylene glycol, di-2,3-butane glycol, triethylene glycol, tetraethylene glycol, pentapropylene glycol, octaethylene glycol, dodecaethylene glycol, pentadecapropylene glycol, tricontaethylene glycol, and other polyalkylene glycols within the above definition having molecular weights of up to 10,000 or more, many of which are commercially available. The presently useful polyalkylene glycols may consist of as many as 200 or more alkylene units joined through oxygen atoms in the chain having one hydroxy radical at each of the terminal alkylene radicals of the chain. Such polyglycols are readily available as is known to those skilled in the art, from the alkylene oxides.

Polythioether alkylene glycols as well as alkylene ether glycols having both sulfur-ether bridges and oxygen-ether bridges may also be used to prepare compounds within the scope of this invention. Such glycol compounds have molecular weights ranging from about 122 to over 10,000. Illustrative examples of such compounds are: diethylene thioglycol, triethylene dithioglycol, tetraethylene trithioglycol, pentaethylene tetrathioglycol, hexaethylene pentathioglycol; dipropylene thioglycol, tripropylene dithioglycol, tetrapropylene trithioglycol, pentapropylene tetrathioglycol, hexapropylene pentathioglycol; diisopropylene thioglycol, triisopropylene dithioglycol, tetraisopropylene trithioglycol, pentaisopropylene tetrathioglycol, hexaisopropylene pentathioglycol; diisobutylene thioglycol, triisobutylene dithioglycol, tetraisobutylene trithioglycol, pentaisobutylene tetrathioglycol, etc.; tetraethylene dithioglycol, pentapropylene dithioglycol, hexaisobutylene trithioglycol, etc., and the higher homologues thereof, e.g., octadecaethylene tetrathioglycol.

The acetylenic acid compounds which are reacted with a glycol of the above defined types are preferably propiolic acid, or an acyl halide or an anhydride thereof. Thus, propiolic acid, propiolyl chloride, bromide, iodide, or fluoride, or propiolic anhydride may be used as the acidic reactant. The propiolyl halide to be used as one of the reactants of the esterification reaction may be prepared by reacting propiolic acid with benzoyl halide. The reaction between benzoyl halide and propiolic acid is almost instantaneous at ambient temperature and being an equilibrium reaction it is desirable to remove one of the product materials during the course of the reaction in order to shift equilibrium in the desired direction. In this respect, propiolyl halide is relatively more volatile than other materials in the reaction mass and for that reason the temperature of reaction is controlled to cause substantial vaporization of the propiolyl halide during the course of the reaction. The preparation of propiolyl chloride according to this procedure forms the subject of the copending application of Lee A. Miller, Serial No. 6,344, filed February 3, 1960. The propiolyl chloride so formed may be led directly, without intermediate recovery, into a solution or suspension of the glycol which is to be esterified according to this invention.

Reaction of an aliphatic ether glycol of the above defined types with propiolic acid, an acyl halide or anhydride thereof takes place readily by simply contacting the acidic compound with the glycol reactant at ordinary or increased temperature and in the presence of an inert diluent or solvent. Advantageously, when propiolic acid is used, reaction is effected at a temperature of from, say, 50° C. to 150° C. and the heating within this temperature range is conducted until the desired degree of esterification has occurred, i.e., until the dipropiolate ester of the glycol used has been formed. Using the acyl halide, optimum conditions include operation at temperatures which may be as low as, say —10° C., that is, extraneous heating is unnecessary; instead cooling may be employed. It is advantageous to employ the reactants in stoichiometric proportions; however, a slight excess of either the acidic reactant or glycol compound may be used. In the presence of an inert diluent or solvent and operating at the temperature which is below 120° C., the reaction proceeds to form the dipropiolate ester of the glycol compound. To obtain a product which is substantially only the dipropiolate ester, the reaction is discontinued when the quantity of evolved by-product is that calculated for dipropiolate esterification. In this case any excess acidic reactant which is present is removed from the reaction mixture, for example, by distillation or extraction. Thus, whether or not the reactants are present in stoichiometric proportions, the use of an inert diluent or solvent and operation at a temperature below 150° C. for a time sufficient to remove the calculated amount of evolved by-product are recommended for obtaining the presently provided, well-characterized esters in good yields. Use of temperatures below 150° C. and operation in the presence of a diluent apparently permits substantial limitation of the reaction to diesterification, rather than to other reactions which could be expected to occur with the highly active triple bonded acidic compounds and the bifunctional hydroxy compounds, for example, addition of the hydroxy radical across the triple bond of the acidic component, polymerization of the acidic compound, linear condensation of the glycol through etherification, etc.

Inert liquid diluents which are useful for the present purpose are liquid hydrocarbons generally, halogenated hydrocarbons, ethers or ketones, for example, benzene, toluene, xylene, hexane, petroleum spirits, dichlorobenzene, ethylene dichloride, carbon tetrachloride, tetrachlorohexane, dioxane, isopropyl ether, acetone, butanone, etc. A solvent or diluent, of course, serves to facilitate uniform distribution of the reactants throughout the reaction medium. When reacting a propiolic acyl halide with the glycol, it is preferred to employ a solvent or diluent which minimizes the tendency of the hydrogen halide by-product to react with the triple bond of the propiolic acid compound. In this connection, the solvent or diluent is selected on the basis of being the least compatible or having the poorest solvency for hydrogen halide. The preferred solvents of diluents for this purpose may be the cycloalkanes, for example, cyclohexane, cyclopentane, or the alkyl-substituted cycloalkanes, etc., and the halogenated hydrocarbons. When using propiolic acid as the starting material in the esterification reaction, water is formed as a by-product material. Since the reaction is of the equilibrium type, it is preferred that the by-product water be removed continuously during the course of the reaction in order to have equilibrium shift in the desired direction. The solvent or diluent employed in the reaction may be selected on the basis that it will form an azeotrope with water or that it boils above water, and thus the temperature of reaction can be maintained at a level which facilitates removal of the water without affecting the diluent or solvent. Considering the prerequisites of a solvent or diluent, generally any organic material which is non-reactive with either the reactants or the product materials may be employed. The quantity of solvent or diluent employed in the reaction varies considerably depending upon the result which is desired. In some instances, it may be desirable to employ a relatively small quantity of diluent as compared to the amount of reactants which are being used, whereas in other cases, it may be desirable to use a relatively large quantity of solvent or diluent to facilitate intermixing of the reactants.

I have also found that when effecting the reaction with the free acid or the acid anhydrides as the propiolic acid reactants, it is advantageous to operate in the presence of an acidic material as catalyst. Acids which are useful for this purpose are, for example, the mineral acids such as sulfuric, phosphoric or chlorosulfonic acid, acidic salts, such as magnesium bisulfate, organic sulfonic acids such as benzenesulfonic or 4-toluenesulfonic acid, etc.

Dipropiolate ether glycol esters provided by this invention are for example, the dipropiolates of diethylene glycol, dipropylene glycol, diisopropylene glycol, dibutylene glycol, diisobutylene glycol, di-2,3-butane glycol, triethylene glycol, tetraethylene glycol, pentapropylene glycol, octaethylene glycol, dodecaethylene glycol, pentadecapropylene glycol, tricontaethylene glycol, and other polyalkylene glycols within the above definition.

As examples of dipropiolates of polyethioether alkylene glycols may be mentioned, for example, the dipropiolates of diethylene thioglycol, triethylene dithioglycol, hexaethylene pentathioglycol, tripropylene dithioglycol, hexapropylene pentathioglycol, triisopropylene dithioglycol, diisobutylene thioglycol, tetraisobutylene trithioglycol, octadecaethylene heptadecathioglycol and docontaethylenedodecathioglycol, etc.

The presently provided propiolic acid esters of the glycols are stable, well-characterized compounds which are advantageously employed for a variety of industrial and agricultural purposes, for example, as hardening agents in synthetic rubber manufacturing processes; as plasticizers for natural and synthetic resins, e.g., in polyvinyl chloride and polyalkylene polymers; as mold release agents in the plastics industry; as toxic components of compositions effective in preventing or inhibiting the growth of plants and microorganisms; and, as hereinbefore disclosed, as paper treatment chemicals which enhance the physical and chemical properties of said paper, as disclosed in copending application, Serial No. 96,384, filed Mar. 17, 1961.

The invention is further illustrated by, but not limited to the following examples.

*Example 1*

A mixture of 21.2 g. (0.2 mole) of diethylene glycol, 30.8 g. (0.44 mole, 10% excess) of propiolic acid, 0.5 g. of p-toluenesulfonic acid, and 150 ml. of benzene was stirred at reflux under a Dean-Stark apparatus while carefully observing and collecting the water by-product. After 12 hours of reflux, 6.9 ml. (96% of theory) of water had evolved and no further evolution was noted so the refluxing was stopped and the mixture was cooled to room temperature. One hundred (100) ml. of ethyl ether was added to the reaction mixture which was then washed successively with two 100 ml. portions of 10% aqueous sodium bicarbonate and two 100 ml. portions of water. The reaction mixture was then dried over magnesium sulfate for two hours, filtered, and evaporated to leave 32.3 g. (77% yield) of the crude diethylene glycol dipropiolate. An analytical sample obtained by distillation (B.P. 120–122° C./0.2 mm.; $n_D^{25}$ 1.4655) analyzed 56.94% carbon and 5.10% hydrogen as compared to 57.14% carbon and 4.80% hydrogen, the calculated values.

*Example 2*

A mixture of 12.2 g. (0.1 mole) of 2,2'-thiodiethanol, 15.4 g. (0.22 mole, 10% excess) of propiolic acid, 150 ml. of benzene, and 0.5 g. of p-toluenesulfonic acid was stirred at reflux temperature under a Dean-Stark apparatus to collect the water by-product. After water evolution was complete, refluxing was discontinued. The reaction mixture was washed, dried and evaporated as in Example 1 to obtain as residue the dipropiolate of 2,2'-thiodiethanol.

*Example 3*

To a 300 ml. reaction vessel there was added 38.8 g. (0.2 mole) of a commercial tetraethylene glycol, 29.4 g. (0.42 mole) of propiolic acid, 100 ml. of benzene and 0.5 g. of p-toluenesulfonic acid. The mixture was refluxed at 81–86.5° C. for 16.5 hours during which time 7.5 ml. of water by-product was trapped. The mixture was stirred with 3 g. of sodium bicarbonate and 0.5 ml.

of water for 25 minutes, decolorized with carbon, and filtered. The filtrate was successively treated with 1 g. portions of calcium oxide and stirred until it tested neutral to litmus, and then concentrated under vacuum to 80° C. There was obtained as residue 58.2 g. of tetraethylene glycol dipropiolate, molecular weight 339, as compared to the theoretical 298 (freezing point depression method in benzene).

Example 4

A mixture consisting of 30.0 g. (0.1 mole) of a polyethylene glycol having an average molecular weight of 300, 14.4 g. (0.206 mole) of propiolic acid, 75 ml. of benzene, and 0.5 g. of p-toluenesulfonic acid monohydrate was refluxed, with the aid of boiling chips, for approximately 6 hours at 80–85° C., until 4.0 ml. of a water by-product had been collected in a Dean-Stark trap. After cooling, the solution was shaken with calcium oxide until the mixture tested neutral to litmus in water, decolorized with charcoal, and then concentrated under vacuum ending at 1 hour at 80° C. with full water pump vacuum, to obtain 35.0 g. of the dipropiolate of the polyethylene glycol (86.6% of theory), which has a molecular weight of 421 as compared to the theoretical molecular weight of 404, using freezing point depression test procedures with dioxane as the solvent.

Ten ml. of a 2% aqueous solution of the above dipropiolate ester of the polyethylene glycol, and 0.125 ml. of a 0.4 molar N-methylmorpholine acetate was used to wet a 2" x 5" strip of Whatman No. 1 filter paper. The wet paper was dried in a forced air oven at 105° C. for 10 minutes after which on rewetting the paper strip in water, the treated paper showed a greatly enhanced qualitative wet strength, compared to a wet untreated piece of the same paper. The wet treated paper could be vigorously rubbed with the fingers without abrading the surface whereas the untreated paper under the same treatment abraded readily.

Example 5

A mixture of 40.0 g. (0.1 mole) of a commercial polyethylene glycol, having an average molecular weight of 400, 15.4 g. (0.22 mole) of propiolic acid, 75 ml. of benzene, and 1.00 g. of p-toluenesulfonic acid monohydrate was stirred at reflux for 17 hours under a Dean-Stark apparatus to collect the water by-product. When 3.9 ml. of water was collected and no more condensation was apparent, the refluxing was discontinued, cooled, diluted with 20 ml. of acetone, and stirred for 35 minutes with 3 g. of calcium oxide. The reaction mixture was then filtered, tested for acidity with litmus paper, and neutralized with lime to moist litmus and alkacid papers. The reaction mixture was decolorized with carbon, filtered, and concentrated to 75° C./0.2 mm. leaving as residue 44.9 g. of a polyethylene glycol dipropiolate, which is soluble to 6.25% in water, and has a molecular weight of 523 as compared to the theoretical molecular weight of 504 using a freezing point depression method with dioxane as the solvent.

Example 6

A mixture of 60.0 g. (0.1 mole) of a polyethylene glycol having an average molecular weight of 600, 15.4 g. (0.22 mole) of propiolic acid, 1.0 g. of p-toluenesulfonic acid monohydrate, and 75 ml. of benzene was heated and stirred at reflux while collecting the water by-product. After refluxing overnight, 3.6 g. of water had been trapped. Refluxing was stopped and the mixture was stirred 4 times for 20 minutes with 2 g. portions of calcium oxide, filtering each time until the mixture tested neutral to litmus paper. The mixture was then decolorized with carbon, filtered, and concentrated at 65° C. for one-half hour under water pump vacuum, and finally for 0.75 hour at 65° C./0.2 mm. leaving 65.5 g. of an amber colored clear liquid, polyethylene glycol dipropiolate, which was soluble to all proportions in water, and had a molecular weight of 710 as compared to the theoretical molecular weight of 704, using freezing point depression technique in dioxane solvent.

Example 7

A mixture of 77.0 g. (0.05 mole) of PEG–1540 (a polyethylene glycol having an average molecular weight of 1540), 8.4 g. (0.12 mole) of propiolic acid, 1.0 g. of p-toluenesulfonic acid, and 90 ml. of benzene was heated at reflux in a Dean-Stark apparatus to collect the water by-product. After 25 hours of refluxing, no more water was obtained, so the mixture was treated with 4 g. of calcium oxide and stirred for 1 hour. As the reaction mixture cooled a soft crystalline mush precipitated from the solution. The crystals were filtered and washed with 20 ml. of acetone. The filtrate was treated with 2 g. of calicum oxide, allowed to stand overnight, decolorized with charcoal, and filtered using a filter aid. The filtrate, which tested neutral to litmus, was concentrated to 80° C. under water pump vacuum, leaving as residue 82.8 g. of the dipropiolate of the polyethylene glycol used as a viscous liquid which solidified to waxy light amber crystals when cool.

A 15 centimeter disc of Whatman No. 1 filter paper was saturated by immersing it into 33 ml. of a 1% aqueous solution of dipropiolate of tetraethylene glycol, prepared as above, to which had been added 0.42 ml. of a 0.42 molar aqueous solution of N-methylmorpholine acetate. It was then drained, air dried, and placed in a 100° C. oven for 15 minutes. The treated paper thus obtained showed substantial improvement in wet strength.

In another experiment, a 15 centimeter disc of the same kind of filter paper was saturated by immersing it into a 1% aqueous solution of the same tetraethylene glycol dipropiolate. After draining and air drying, the disc was maintained for 5 minutes in a chamber through which there was passed a stream of nitrogen gas containing volatilized N-methylmorpholine entrained therein, and it was then air dried for 30 minutes and finally maintained in a 100° C. oven for 15 minutes. Improvement in wet strength of the paper by this treatment was likewise obtained.

This invention thus provides compounds which are valuable cross-linking agents and provides methods for cross-linking products which are internally plasticized by reaction of the dipropiolate ester of the glycol compound. For example, these materials cross-link with polyol materials such as polysaccharides, examples being cellulose and starch materials, by forming ester vinyl ether linkages through the triple bond of the dipropiolate ester and the OH portion of the polyol reactant. The thus treated polyol product is cross-linked which adds to its toughness and flexibility. Paper products which have been cross-linked in this manner are well stabilized to those dimensional changes which normally occur on the absorption and desorption of water by paper. Tensile strength, bursting strength and elasticity in the wet state are materially increased. The cross-linked paper thus can be used for a variety of purposes where moisture is liable to be encountered and where disintegration by moisture is to be avoided. Thus, it can be used for wrapping moist foods, for posters, wall paper, maps, and cement bags, etc. The cross-linked paper is particularly valuable in the production of tissues and thin sheeting.

The polyglycol dipropiolate esters of this invention derived from polyalkylene glycols having molecular weights of about 400 to 1000 are particularly valuable for paper treating purposes since such esters are water soluble to a substantial degree, which property permits the dipropiolate to more thoroughly permeate the fibers of the cellulose and react with the hydroxyl groups thereof more efficiently, to obtain cross-linked paper products having no discoloration because of the chemical treatment thereof.

I claim:
1. An ester of the formula

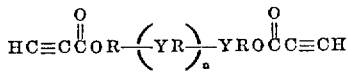

whereas Y is selected from the group consisting of oxygen and sulfur; R is an alkylene radical having from 2 to 4 carbon atoms in the alkylene chain and a total of from 2 to 6 carbon atoms in the alkylene radical; and $n$ is a whole number from 0 to 200, said R radicals being linked through diverse carbon atoms thereof to the remainder of the molecule of which it forms a part.

2. An ester of the formula

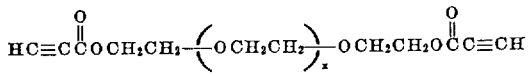

wherein $x$ is a whole number of from 0 to 200.
3. Diethylene glycol dipropiolate.
4. Tetraethylene glycol dipropiolate.
5. A dipropiolate ester of a polyethylene glycol having an average molecular weight of about 300.
6. A dipropiolate ester of a polyethylene glycol having an average molecular weight of about 600.
7. A dipropiolate ester of a polyethylene glycol having an average molecular weight of about 1540.
8. An ester of the formula

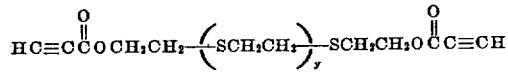

wherein $y$ is a number of from 0 to 200.
9. 2,2'-thiodiethanol dipropiolate.
10. A method which comprises reacting, in the presence of an inert diluent, and at a temperature below 150° C., a member of the group consisting of propiolic acid, and acyl halides, and anhydride thereof, with a glycol of the formula

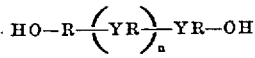

wherein Y is selected from the group consisting of oxygen and sulfur, R is an alkylene radical having from 2 to 4 carbon atoms in the alkylene chain and a total of from 2 to 6 carbon atoms in the radical; and $n$ is a number of from 0 to 200, and recovering from the resulting reaction mixture a compound of the formula

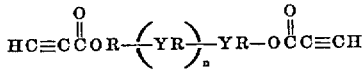

wherein Y, R and $n$ are as defined above.

11. A method which comprises reacting propiolic acid, in the presence of an inert diluent, and at a temperature below 150° C., with a glycol of the formula

wherein $x$ is a number of from 0 to 200, and recovering from the resulting reaction mixture a compound of the formula

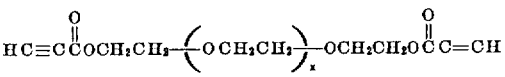

wherein $x$ is as defined above.

12. A method which comprises reacting propiolic acid, in the presence of an inert diluent, and at a temperature below 150° C., with diethylene glycol, and recovering from the resulting reaction mixture diethylene glycol dipropiolate.

13. A method which comprises reacting propiolic acid, in the presence of an inert diluent, and at a temperature below 150° C., with tetraethylene glycol, and recovering from the resulting reaction mixture tetraethylene glycol dipropiolate.

14. A method which comprises, reacting propiolic acid, in the presence of an inert diluent, and at a temperature below 150° C., a polyethylene glycol having an average molecular weight below about 4500, and recovering from the resulting reaction mixture a dipropiolate ester of the polyethylene glycol.

15. A method which comprises reacting propiolic acid in the presence of an inert diluent, and at a temperature below 150° C., with a glycol of the formula

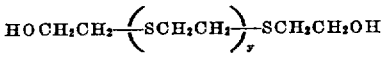

wherein $y$ is a number of from 0 to 200, and recovering from the resulting reaction mixture a compound of the formula

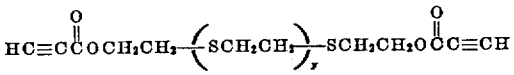

wherein $y$ is as above defined.

16. A method which comprises reacting, in the presence of an inert diluent, and at a temperature below 150° C., 2,2'-thiodiethanol, and recovering from the resulting reaction mixture, 2,2'-thiodiethanol dipropiolate.

References Cited in the file of this patent

UNITED STATES PATENTS

| 2,290,649 | Macallum | July 21, 1942 |
| 2,900,368 | Stilmar | Aug. 18, 1959 |
| 2,988,572 | Mills et al. | June 13, 1961 |
| 2,996,538 | Van Dijik | Aug. 15, 1961 |

OTHER REFERENCES

Heaton et al.: J.A.C.S. 2948–49 (1949).

UNITED STATES PATENT OFFICE
CERTIFICATE OF CORRECTION

Patent No. 3,082,245                                            March 19, 1963

Lee A. Miller

It is hereby certified that error appears in the above numbered patent requiring correction and that the said Letters Patent should read as corrected below.

Column 2, line 41, for "henzoyl" read -- benzoyl --; column 4, line 11, for "polyethioether" read -- polythioether --; column 8, lines 5 to 7, the formula should appear as shown below instead of as in the patent:

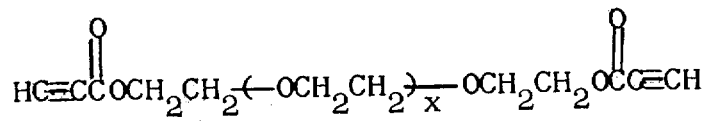

Signed and sealed this 25th day of February 1964.

(SEAL)
Attest:
ERNEST W. SWIDER                                      EDWIN L. REYNOLDS Attesting Officer                                          Acting Commissioner of Patents